(12) United States Patent
Hotta

(10) Patent No.: US 10,711,753 B2
(45) Date of Patent: Jul. 14, 2020

(54) INTERNAL COMBUSTION ENGINE

(71) Applicant: TOYOTA JIDOSHA KABUSHIKI KAISHA, Toyota-shi, Aichi-ken (JP)

(72) Inventor: Shintaro Hotta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/238,312

(22) Filed: Jan. 2, 2019

(65) Prior Publication Data

US 2019/0226438 A1 Jul. 25, 2019

(30) Foreign Application Priority Data

Jan. 25, 2018 (JP) .................................. 2018-010544

(51) Int. Cl.
| | |
|---|---|
| *F02M 61/18* | (2006.01) |
| *F02M 47/02* | (2006.01) |
| *F02D 41/30* | (2006.01) |
| *F02M 61/16* | (2006.01) |
| *F02B 3/10* | (2006.01) |
| *F02M 61/14* | (2006.01) |
| *F02D 41/38* | (2006.01) |
| *F02B 75/12* | (2006.01) |

(52) U.S. Cl.
CPC ........... *F02M 61/1806* (2013.01); *F02B 3/10* (2013.01); *F02D 41/30* (2013.01); *F02M 47/02* (2013.01); *F02M 61/14* (2013.01); *F02M 61/168* (2013.01); *F02B 2075/125* (2013.01); *F02D 2041/389* (2013.01); *F02M 2200/852* (2013.01)

(58) Field of Classification Search
CPC .. F02M 61/1806; F02M 61/14; F02M 61/168; F02M 47/02; F02M 2200/852; F02D 41/30; F02D 2041/389; F02B 3/10

USPC .......................................... 123/299, 305, 304
See application file for complete search history.

(56) References Cited

U.S. PATENT DOCUMENTS

| | | | | |
|---|---|---|---|---|
| 5,816,215 A | * | 10/1998 | Yoshikawa | ........... F02B 23/104 123/301 |
| 6,138,639 A | * | 10/2000 | Hiraya | ...................... F01L 3/06 123/295 |
| 7,357,117 B2 | * | 4/2008 | Yoshikawa | ............... F01L 3/06 123/188.14 |

FOREIGN PATENT DOCUMENTS

| | | | |
|---|---|---|---|
| JP | 2010-185457 A | 8/2010 | |
| WO | WO-2012157483 A1 | * 11/2012 | .............. F02B 23/10 |

* cited by examiner

*Primary Examiner* — Mahmoud Gimie
(74) *Attorney, Agent, or Firm* — Oliff PLC

(57) ABSTRACT

An internal combustion engine includes two intake openings, opened and closed by intake valves; exhaust openings opened and closed by exhaust valves; a fuel injector having a plurality of nozzle holes; and mask parts having wall surfaces extending along outer edges of the intake openings toward the inside of the combustion chamber. The fuel injector arranged wherein the nozzle holes are positioned at the opposite exhaust opening sides from the intake openings, and the plurality of nozzle holes include a first nozzle hole, injecting in a direction with the smallest angle from a plane perpendicular to the axial direction of the cylinder. The wall surface formed wherein a height in a first nozzle hole ejection region positioned in a range of injection of a fuel spray from the first nozzle hole, when viewed in the axial direction, is lower than a height in the first nozzle hole ejection region.

4 Claims, 10 Drawing Sheets

INTERNAL COMBUSTION ENGINE

FIELD

The present invention relates to an internal combustion engine.

BACKGROUND

In the past, it has been proposed to provide mask parts around intake openings opened and closed by intake valves (for example, Japanese Patent Publication No. 2010-185457 A). The mask parts are provided with wall surfaces formed so as to extend along the outer edges of the intake openings toward the inside of the combustion chamber, at the opposite sides to the exhaust opening sides (below, referred to as the "opposite exhaust opening sides").

The wall surfaces of such mask parts function as flow resistances against part of the intake gas taken in from the intake ports into the combustion chamber, when the intake valves are lifted. The intake gas passing through regions positioned at the opposite exhaust opening sides of the intake openings is thereby prohibited or inhibited from flowing into the combustion chamber. As a result, a reverse tumble flow is kept from being generated in the combustion chamber and a strong normal tumble flow is formed in the combustion chamber.

SUMMARY

Technical Problem

Known in the art is an internal combustion engine provided with a fuel injector directly injecting fuel into a combustion chamber. As such an internal combustion engine, there are ones where a nozzle hole of the fuel injector is positioned at the center of the combustion chamber and ones where a nozzle hole of the fuel injector is positioned between two intake openings at the opposite exhaust opening side from the intake openings. Among these, in the latter fuel injector, for example, fuel is injected so that the center axis of the fuel spray from the fuel injector passes between the two intake openings.

In this regard, however, when fuel is injected from a fuel injector in this way, for example, if as described in Japanese Patent Publication No. 2010-185457 A the wall parts of the mask parts are provided along the entire outer edges of the intake openings at the opposite exhaust opening sides, the mask parts will interfere with the fuel spray. As a result, part of the injected fuel will deposit on the mask parts. Therefore, deterioration of the fuel efficiency due to an increase in the fuel not contributing to combustion or a deterioration of the exhaust emission due to the formation of particulate matter and poor mixing of the air-fuel mixture may occur.

On the other hand, if making the heights of the wall surfaces of the mask parts low overall or providing the mask parts only around the outer edges of the regions where the two intake openings are separated from each other, the wall surfaces of the mask parts will become harder to function as flow resistances against the intake gas running through the regions positioned at the opposite exhaust opening sides of the intake openings. Therefore, a relatively strong reverse tumble flow will be generated in the combustion chamber, and the tumble flow generated in the combustion chamber will become weaker.

The present invention was made in consideration of the above technical problem, and an object of the present invention is to suitably form the mask parts to thereby keep the weakening of the tumble flow small while keeping the fuel efficiency and exhaust emission from deteriorating.

Solution to Problem

The present invention was made so as to solve the above problem and has as its gist the following.

(1) An internal combustion engine comprising:
two intake openings facing a combustion chamber, and opened and closed by intake valves;
exhaust openings facing the combustion chamber, and opened and closed by exhaust valves;
a fuel injector having a plurality of nozzle holes; and
mask parts having wall surfaces extending along outer edges of the intake openings toward the inside of the combustion chamber at the opposite sides to the exhaust opening sides,
wherein the fuel injector is arranged so that the nozzle holes are positioned between the two intake openings at the opposite sides to the exhaust opening sides from the intake openings,
the plurality of nozzle holes include a first nozzle hole, among the plurality of nozzle holes, injecting fuel in a direction with the smallest angle from a plane perpendicular to the axial direction of the cylinder, and
the wall surfaces are formed so that a height in a first nozzle hole ejection region positioned in a range of injection of a fuel spray from the first nozzle hole, when viewed in the axial direction of the cylinder, is lower than a height in regions other than the first nozzle hole ejection region.

(2) The internal combustion engine according to above (1), wherein the wall surface is formed so that a height in another nozzle hole ejection region positioned outside of a range of injection of a fuel spray from the first nozzle hole and inside of a range of injection of a fuel spray from a nozzle hole other than the first nozzle hole, when viewed in the axial direction of the cylinder, is equal to a height of a region separated the most from the exhaust opening side.

(3) The internal combustion engine according to above (1) or (2), wherein
the first nozzle hole is just a single hole, and
the fuel injector is configured so that a center axis of a fuel spray from the first nozzle hole passes between the two intake openings.

Advantageous Effects of Invention

According to the present invention, by suitably forming the mask parts, it is possible to keep the weakening of the tumble flow small while keeping the fuel efficiency and exhaust emission from deteriorating.

DESCRIPTION OF EMBODIMENTS

Figure 1:
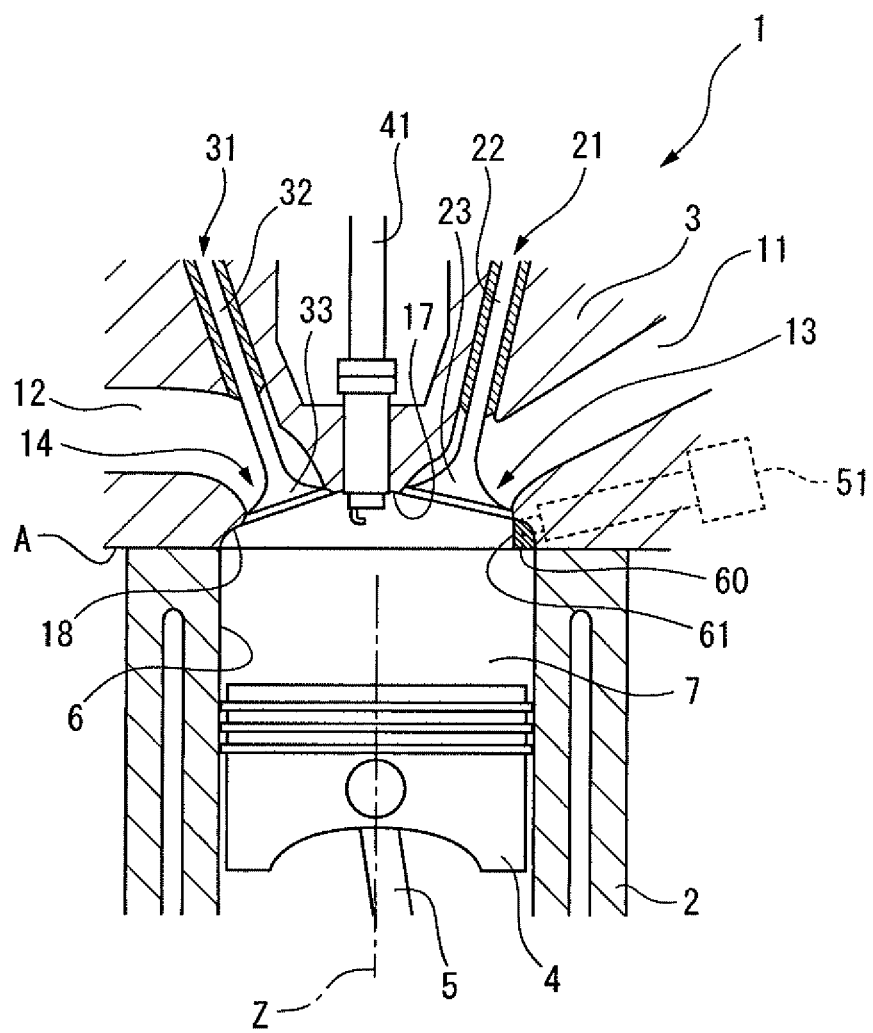
FIG. 1 is a partial cross-sectional view schematically showing an internal combustion engine according to a first embodiment.

Below, referring to the drawings, embodiments of the present invention will be explained in detail. Note that in the following explanation, similar components are assigned the same reference notations.

Configuration of Internal Combustion Engine

FIG. 1 is a partial cross-sectional view schematically showing an internal combustion engine 1 according to the present embodiment. As shown in FIG. 1, the internal combustion engine 1 is provided with a cylinder block 2, a cylinder head 3, pistons 4, and a connecting rod 5.

The cylinder block 2 is provided with a plurality of cylinders 6 arranged aligned. The cylinder head 3 is arranged so as to abut against the cylinder block 2 at an abutting surface A and is arranged so as to close off first openings of the cylinders 6 formed at the cylinder block 2.

Each piston 4 is arranged so as to reciprocate through the inside of a cylinder 6 formed in the cylinder block 2. The piston 4 is connected through a piston pin to the connecting rod 5. The connecting rod 5 is connected through a crank pin to a crankshaft (not shown). The connecting rod 5 acts to convert the reciprocating motion of the piston 4 to rotary motion of the crankshaft. Further, the wall surface of a cylinder 6 of the cylinder block 2, the cylinder head 3 and piston 4 form a combustion chamber 7 in which the air-fuel mixture is burned.

Figure 2:
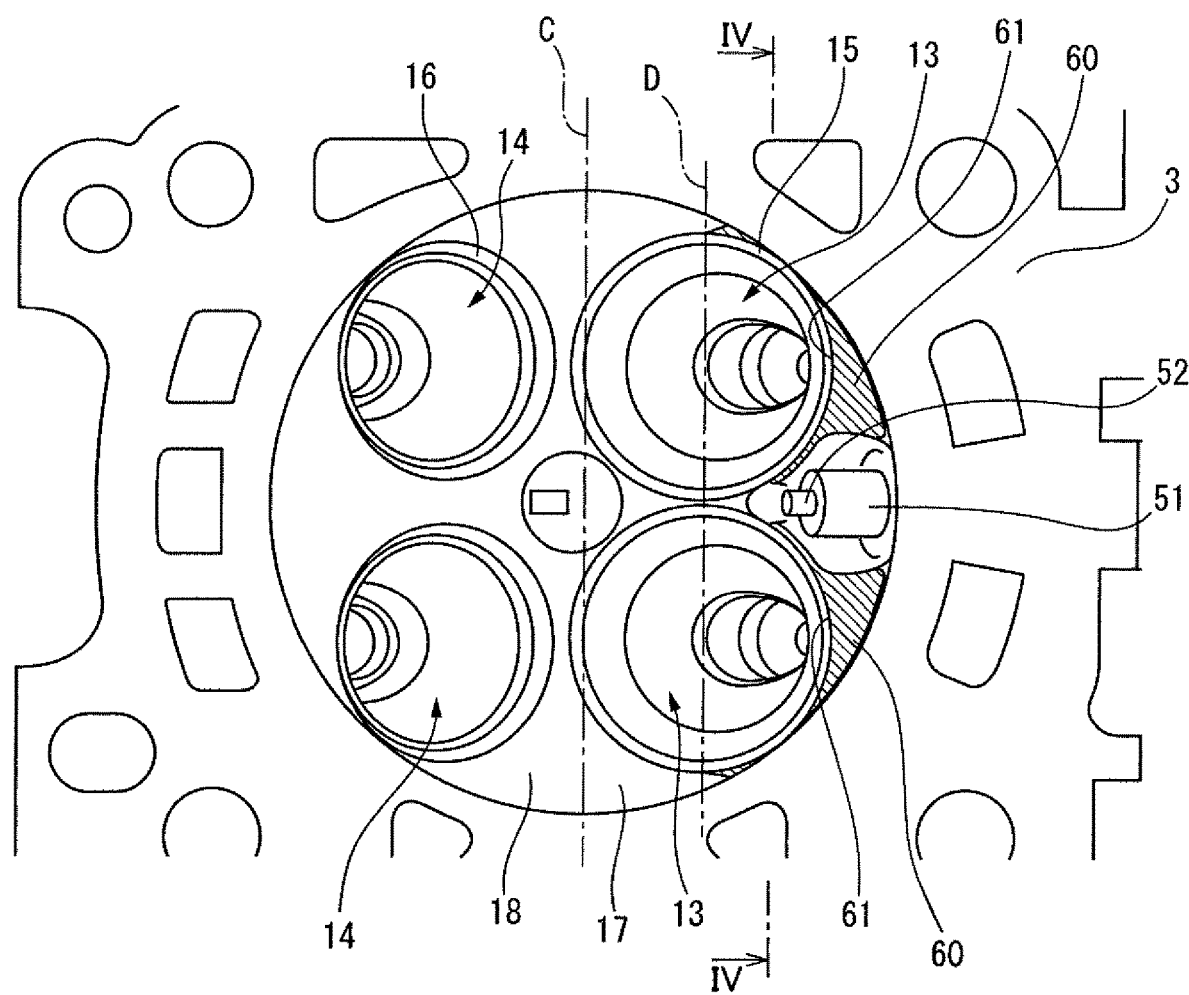
FIG. 2 is a partial bottom view schematically showing a bottom surface of a cylinder head.

FIG. 2 is a partial bottom view schematically showing the bottom surface of the cylinder head 3. In particular, FIG. 2 schematically shows the part of the cylinder head 3 positioned so as to close one cylinder 6. Further, FIG. 2 shows the state where the intake valves 21 and exhaust valves 31 are not provided.

As shown in FIGS. 1 and 2, the cylinder head 3 is formed with intake ports 11 and exhaust ports 12. The intake ports 11 face the combustion chambers 7, and communicate with the combustion chambers 7 through intake openings 13 formed at the cylinder head 3. Similarly, the exhaust ports 12 face the combustion chambers 7, and communicate with the combustion chambers 7 through exhaust openings 14 formed at the cylinder head 3.

As shown in FIG. 2, in the present embodiment, at each combustion chamber 7, two intake openings 13 and two exhaust openings 14 are provided. The two intake openings 13 are arranged aligned in the same direction as the direction which the plurality of cylinders 6 are aligned (below, referred to as the "cylinder arrangement direction"). Similarly, the two exhaust openings 14 are arranged aligned in the same direction as the cylinder arrangement direction. The two intake openings 13 are arranged at one side of the center plane C extending through the center of the cylinder 6 and extending in the cylinder arrangement direction, while the two exhaust openings 14 are arranged at the other side.

Note that, in this Specification, the direction perpendicular to the cylinder arrangement direction and heading from the center plane C to the intake openings 13, that is, the direction from the exhaust openings 14 toward the intake openings 13, will be referred to as the "opposite exhaust opening side", while the direction perpendicular to the cylinder arrangement direction and heading from the center plane C to the exhaust openings 14, that is, the direction from the intake openings 13 toward the exhaust openings 14, will be referred to as the "exhaust opening side".

Further, as shown in FIG. 2, intake seat parts 15, at which the intake valves 21 (explained later) abut at the time of valve closure, are provided over the entire circumferences around the edge parts of the intake openings 13. Similarly, exhaust seat parts 16, at which the exhaust valves 31 (explained later) abut at the time of valve closure, are provided over the entire circumferences around the edge parts of the exhaust openings 14. The intake seat parts 15 may be formed as valve seats separate from the cylinder head 3 or may be seats directly formed at the cylinder head 3.

As shown in FIG. 1, the cylinder head 3 is formed so that the top surface of each combustion chamber 7 has two slanted surfaces of the intake side slanted surface 17 and the exhaust side slanted surface 18. The intake side slanted surface 17 is formed so that the height from the abutting surface A (length from abutting surface A in axial direction Z of cylinder 6) becomes higher from the edge part of the intake opening side (opposite exhaust opening side) toward the center plane C. The exhaust side slanted surface 18 is formed so that the height from the abutting surface A becomes higher from the edge part of the exhaust opening side toward the center plane C. Therefore, the top surface of the combustion chamber 7 is slanted so as to become highest at the center plane C.

Further, the cylinder head 3 is provided with intake valves 21 opening and closing the intake openings 13, exhaust valves 31 opening and closing the exhaust openings 14, spark plugs 41 igniting an air-fuel mixture in the combustion chambers 7, and fuel injectors 51 directly injecting fuel into the combustion chambers 7.

Each intake valve 21 is provided with a valve stem 22 and a valve head 23 fixed to one end of the valve stem 22. The intake valve 21 is arranged in the cylinder head 3 to be able to slide in the direction in which the valve stem 22 extends, that is, the axial direction of the intake valve 21. The intake valve 21 is lifted in its axial direction by an intake valve operating mechanism (not shown). The intake valve operating mechanism may be a variable valve operating mechanism able to change at least one of an operating angle, phase angle, and maximum amount of lift of the intake valve 21, or may be a valve operating mechanism unable to change these.

Similarly, each exhaust valve 31 is provided with a valve stem 32 and a valve head 33 fixed to one end of the valve stem 32. The exhaust valve 31 is arranged in the cylinder head 3 to be able to slide in the direction in which the valve stem 32 extends, that is, the axial direction of the exhaust valve 31. The exhaust valve 31 is lifted in the axial direction by the exhaust valve operating mechanism (not shown). The exhaust valve operating mechanism may be a variable valve operating mechanism able to change at least one of an operating angle, phase angle, and maximum lift of the exhaust valve 31, or may be a valve operating mechanism unable to change these.

Each spark plug 41 is attached to the cylinder head 3 so as to be positioned at the top surface of a combustion chamber 7 at the substantial center of the combustion chamber 7. Note that, the spark plug 41 need not necessarily be provided. In this case, the fuel injection from the fuel injector 51 is controlled so that the air-fuel mixture self ignites in the combustion chamber 7.

Each fuel injector 51 is provided with a tip part 52 having a plurality of nozzle holes injecting fuel, and is arranged in the cylinder head 3 so that the tip part 52 is exposed in a combustion chamber 7. In particular, in the present embodiment, the tip part 52 of the fuel injector 51, that is, the nozzle holes of the fuel injector 51, is positioned between the two intake openings 13 at the opposite exhaust opening side from the intake openings 13.

Figure 3:
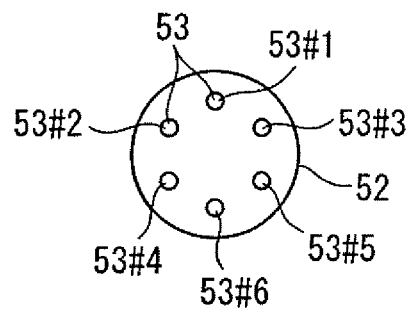
FIG. 3 is a side view schematically showing a tip surface of a tip part of a fuel injector.

FIG. 3 is a side view schematically showing a tip surface of a tip part 52 of a fuel injector 51. The upward direction in FIG. 3 is the axial direction Z of the cylinder 6 and the direction from the cylinder block 2 toward the cylinder head 3 (to facilitate understanding, below, this direction will be explained as "upward").

As will be understood from FIG. 3, the tip part 52 of the fuel injector 51 is provided with six nozzle holes 53. In the illustrated example, a first nozzle hole 53#1 is provided at the topmost position among the plurality of nozzle holes, while a sixth nozzle hole 53#6 is provided at the bottommost position among the plurality of nozzle holes. The second nozzle hole 53#2 and the third nozzle hole 53#3 are provided between the first nozzle hole 53#1 and the sixth nozzle hole 53#6 in the axial direction Z of the cylinder 6. The fourth nozzle hole 53#4 and the fifth nozzle hole 53#5 are provided between the second and third nozzle holes 53#2 and 53#3 and the sixth nozzle hole 53#6 in the axial direction Z of the cylinder 6.

Next, referring to FIGS. 4 and 5, the state of spray of fuel from the fuel injector 51 configured as above, will be explained.

Figure 4:
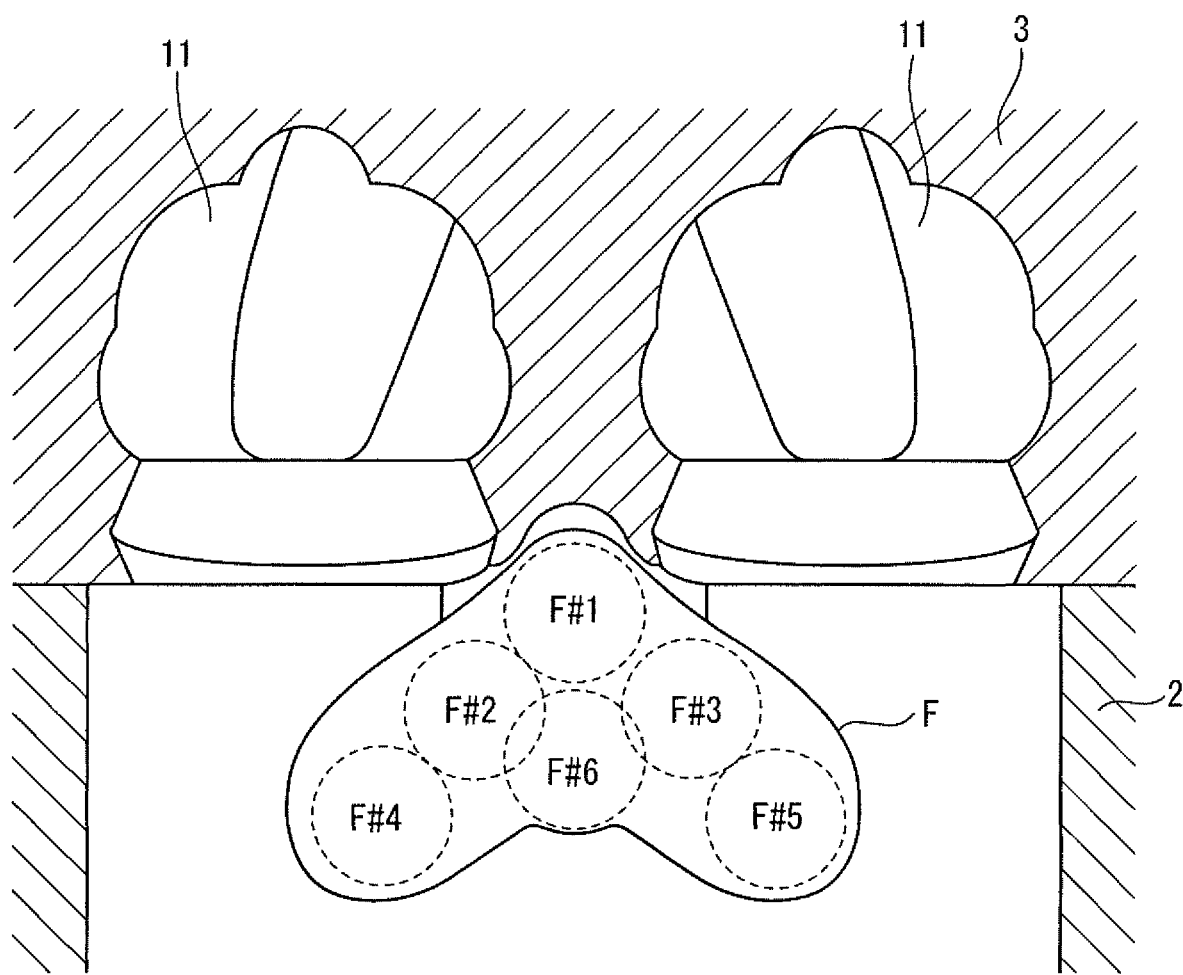
FIG. 4 is a cross-sectional view of part of a cylinder head seen along the line IV-IV of FIG. 2.

FIG. 4 is a cross-sectional view of part of the cylinder head 3 seen along the line IV-IV of FIG. 2. In the figure, F shows the range of injection in that cross-section in the case where fuel is injected from a fuel injector 51. F #1 in the figure shows the range of injection of the fuel spray from the first nozzle hole 53#1, in that cross-section. F #2 to F #6 similarly show the ranges of injection of the fuel spray from the second nozzle hole 53#2 to sixth nozzle hole 53#6, in that cross-section.

Figure 5:
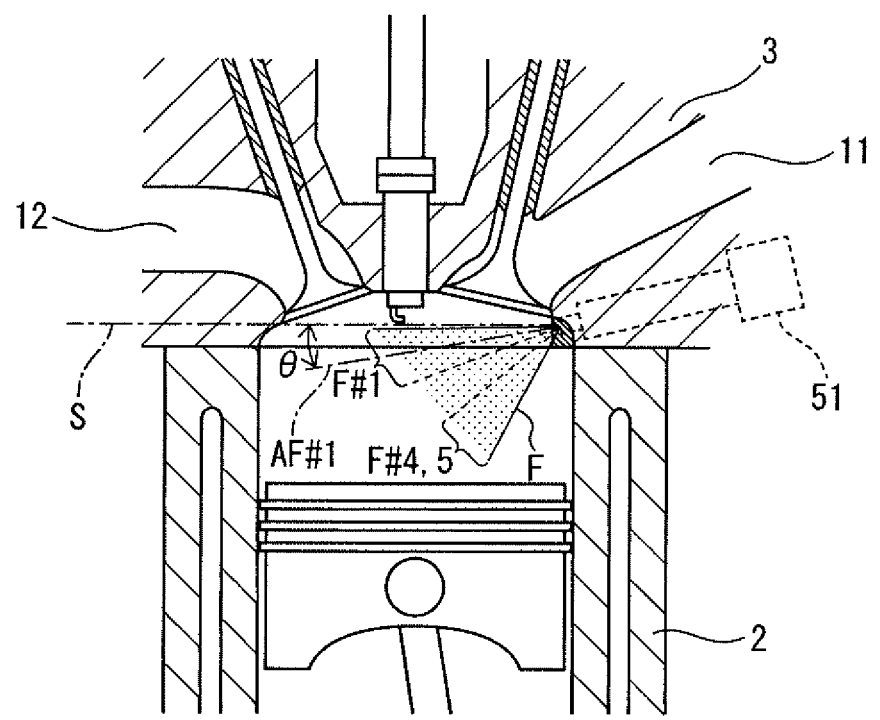
FIG. 5 is a partial cross-sectional view, similar to FIG. 1, in the state where fuel is injected from a fuel injector.

Further, FIG. 5 is a partial cross-sectional view, similar to FIG. 1, in the state where fuel is injected from a fuel injector 51. In the figure, F #1 shows the range of injection of a fuel spray from the first nozzle hole 53#1, while F #4 and 5 respectively show the range of injection of fuel sprays from the fourth nozzle hole 53#4 and the fifth nozzle hole 53#5.

As will be understood from FIGS. 4 and 5, the first nozzle hole 53#1 injects fuel in a direction of the smallest angle θ from the plane S perpendicular to the axial direction Z of the cylinder 6 among the plurality of nozzle holes 53. Therefore, the center axis AF #1 of the spray from the first nozzle hole 53#1 is the smallest in angle θ from the plane S in the center axes of the fuel sprays from the plurality of nozzle holes 53. Further, the fuel spray from the first nozzle hole 53#1 is sprayed so that its center axis AF #1 passes between two intake openings 13.

On the other hand, the fuel sprays from the second nozzle hole 53#2 to the sixth nozzle hole 53#6 are injected so that the angles from the plane S become larger in the order of the fuel sprays from the second and third nozzle holes 53#2 and 53#3, the fuel spray from the sixth nozzle hole 53#6, and the fuel sprays from the fourth and fifth nozzle holes 53#4 and 53#5. Further, the fuel spray from the sixth nozzle hole 53#6 is also injected so that its center axis passes between two intake openings 13. The fuel sprays from the second and third nozzle holes 53#2 and 53#3 are injected so that slight angles are given with respect to directions heading toward the exhaust openings 14, in opposite directions to each other. Further, the fuel sprays from the fourth and fifth nozzle holes 53#4 and 53#5 are injected so that relatively large angles are given with respect to directions heading toward the exhaust openings 14, in opposite directions to each other.

Figure 6:
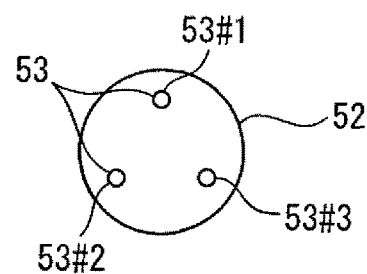
FIG. 6 is a side view schematically showing a tip surface of a tip part of a fuel injector.

Note that, in the above embodiments, each fuel injector 51 has six nozzle holes, but the number of nozzle holes may be greater than or less than six as well. For example, if the fuel injector 51 has three nozzle holes, as shown in FIG. 6, the fuel injector 51 is provided with the first nozzle hole 53#1, the second nozzle hole 53#2, and the third nozzle hole 53#3.

Figure 7:
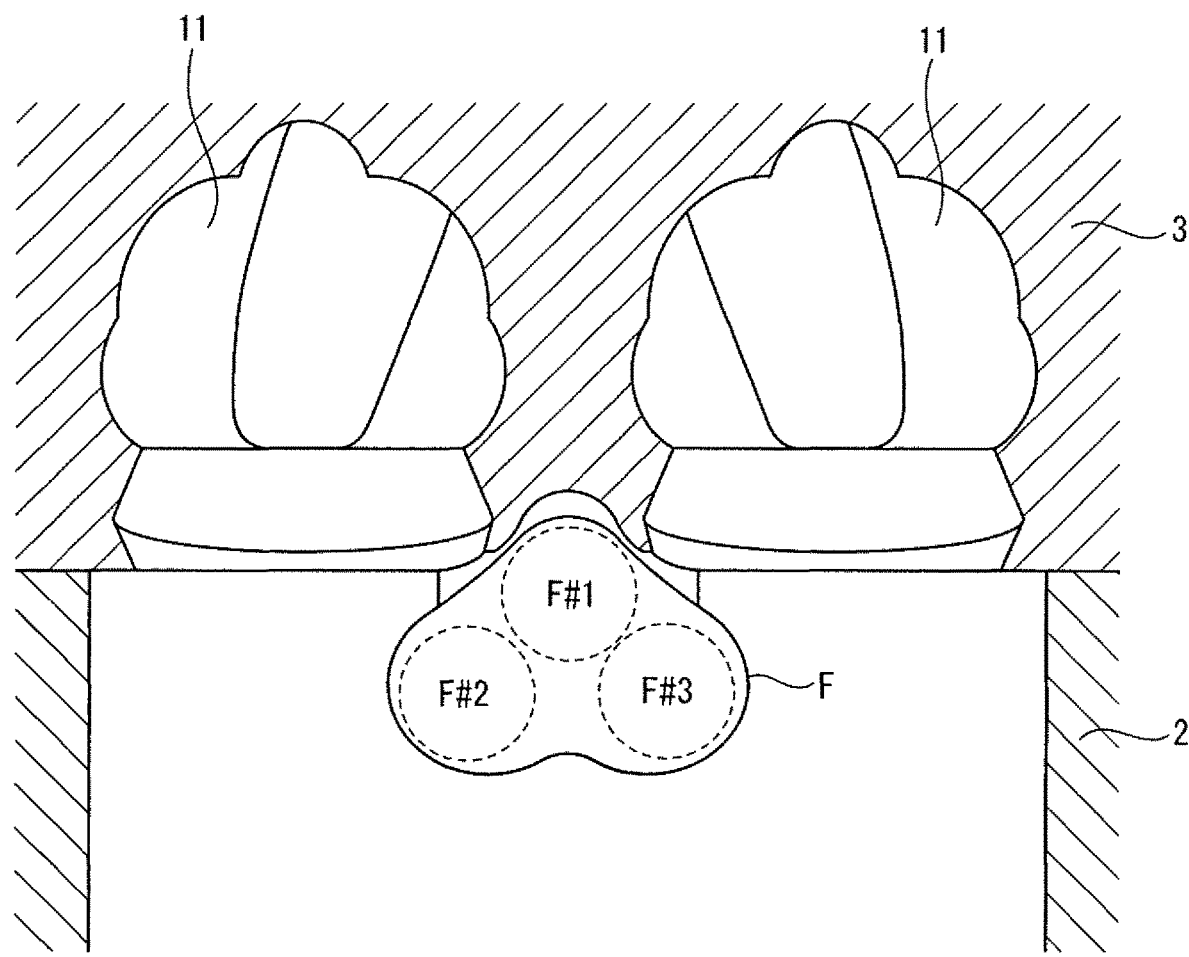
FIG. 7 is a cross-sectional view, similar to FIG. 4, of part of a cylinder head seen along the line IV-IV of FIG. 2.

In this case, as shown in FIG. 7, the fuel spray from the first nozzle hole 53#1 is injected in a direction of the smallest angle θ from the plane S perpendicular to the axial direction Z of the cylinder 6, among the plurality of nozzle holes 53. Therefore, the center axis AF #1 of the fuel spray from the first nozzle hole 53#1 is the smallest in angle θ from the plane S, among the center axes of the fuel sprays from the plurality of nozzle holes 53. In addition, the center axis of the fuel spray from the first nozzle hole 53#1 passes between the two intake openings 13.

Further, in the above embodiments, only one of the plurality of nozzle holes injects fuel in a direction of the smallest angle θ from the plane S. However, there may also be a plurality of nozzle holes which inject fuel in a direction of the smallest angle θ from the plane S.

Configuration of Mask Parts

As shown in FIGS. 1 and 2, the cylinder head 3 of the present embodiment is provided with mask parts 60 provided at the opposite exhaust opening sides of the intake openings 13. Below, the mask parts 60 will be explained referring to FIGS. 1 and 2 and, in addition, FIGS. 8 and 9. Note that, in FIG. 2, the mask parts 60 are hatched. This hatch is to show the mask parts 60 in an easily understandable manner, and does not show a cross-section.

Figure 8:
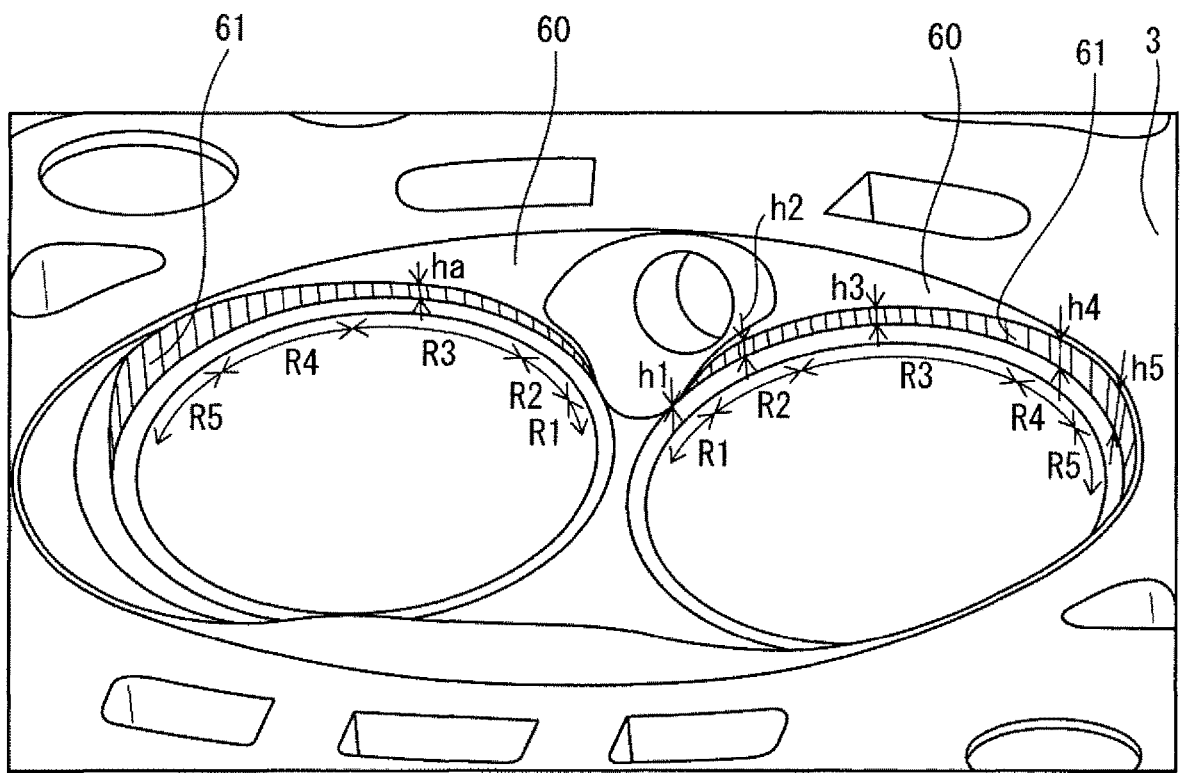
FIG. 8 is a partial perspective view showing a bottom surface of part of a cylinder head.
Figure 9:
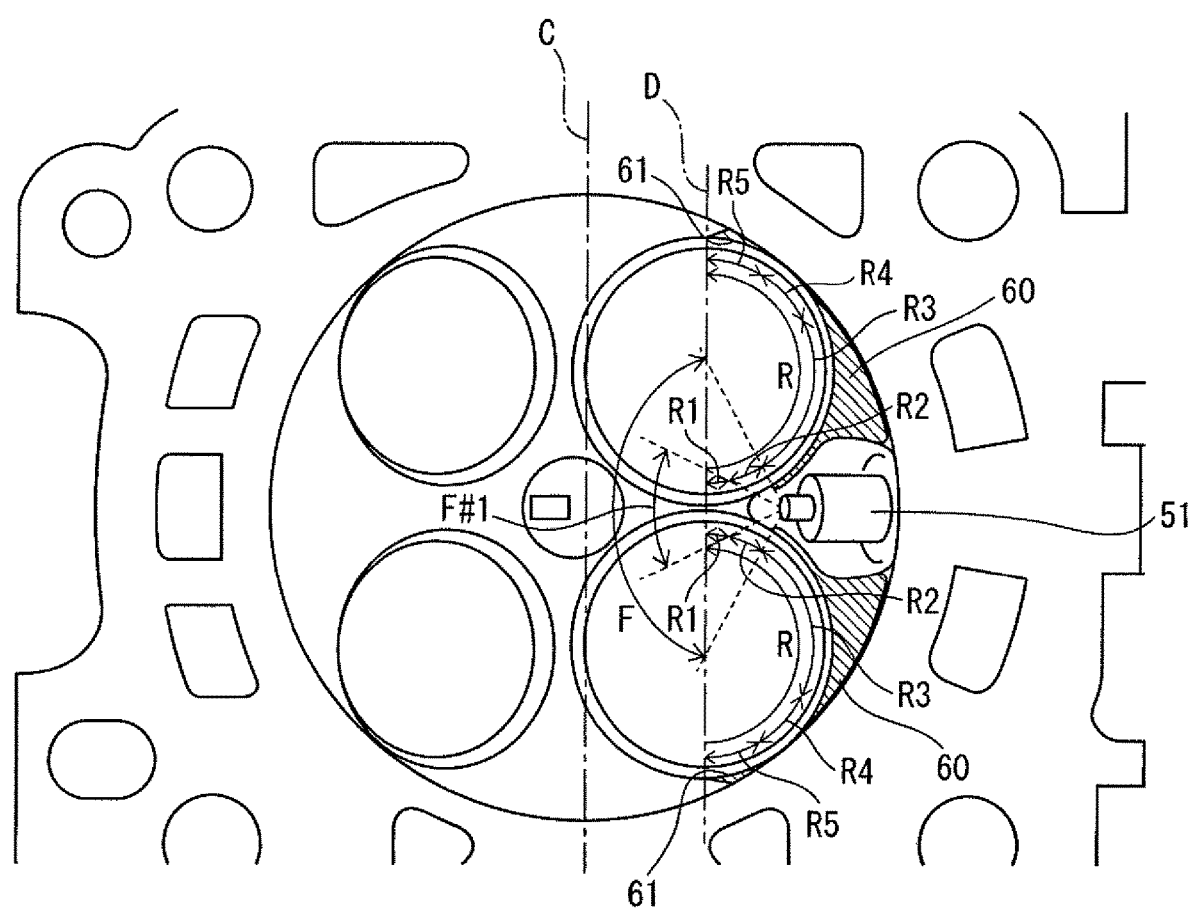
FIG. 9 is a partial bottom view, similar to FIG. 2, schematically showing a bottom surface of a cylinder head.

FIG. 8 is a partial perspective view showing the bottom surface of part of the cylinder head 3. Further, FIG. 9 is a partial bottom view similar to FIG. 2, schematically showing the bottom surface of the cylinder head 3. As shown in FIGS. 1 and 8, the mask parts 60 are formed so as to stick out from the top surface of the combustion chamber 7 toward the inside of the combustion chamber 7. The mask parts 60 may be formed integrally with the cylinder head 3 or may be formed separately. Note that, if the mask parts 60 are formed integrally with the cylinder head 3, the mask parts 60 are formed so that at least parts of their bottom surfaces become flush with the abutting surface A of the cylinder head 3.

As will be understood from FIG. 8, the mask parts 60 have wall surfaces 61 extending along the outer edges of the intake openings 13 and along the outer edges of the intake seat parts 15 around the intake openings 13. The wall surfaces 61 of the mask parts 60 are formed so that the clearances from the edge parts of the intake valves 21 are constant. In this regard, the edge parts of the intake valves 21 more accurately mean the surfaces of the edge parts of the intake valves 21 passed when the intake valves 21 are lifted.

Therefore, the wall surfaces 61 of the mask parts 60 more accurately are formed so that the clearances from the surfaces of the edge parts of the intake valves 21 passed in the lift direction of the intake valve 21 are constant.

Further, the wall surfaces 61 are formed so as to extend in whole or part in the regions at the opposite exhaust opening sides from the center axes D of the intake openings 13 in the cylinder arrangement direction (regions shown by R in FIG. 9). In particular, the wall surfaces 61 are preferably formed so as to extend over at least halves of the regions in the regions shown by R in FIG. 9. In the example shown in FIGS. 8 and 9, the wall surfaces 61 are formed so as to extend substantially completely in the regions shown by R in FIG. 9.

In addition, the wall surfaces 61 extend from near the outer edges of the intake openings 13 toward the inside of the combustion chamber 7, in particular in the lift directions of the intake valves 21. In the present embodiment, the heights of the wall surfaces 61 change in the peripheral directions of the intake openings 13. Note that, in the Description, the "heights of the wall surfaces 61" mean the lengths of the wall surfaces 61 in the lift directions of the intake valves 21 from planes the same as the outer surfaces of the valve heads 23 when the intake valves 21 close.

In this regard, in each region shown by R in FIG. 9, when viewed in the axial direction Z of the cylinder 6, the region positioned in the range of injection F #1 of the fuel spray from the first nozzle hole 53#1 is designated as the first region (first nozzle hole ejection region) R1. Further, in each region shown by R in FIG. 9, when viewed in the axial direction Z of the cylinder 6, the region positioned outside of the range of injection F #1 of the fuel spray from the first nozzle hole 53#1 and in the ranges of injection F of the fuel sprays from the nozzle holes 53#2 to 53#6 other than the first nozzle hole 53#1 is designated as the second region (other nozzle hole ejection region) R2.

Further, in each region shown by R in FIG. 9, the region adjoining the second region R2 at the opposite side to the first region R1 is designated as the third region R3. The third region R3 includes the region positioned separated the most from the exhaust opening side, that is, the region positioned the most at the opposite exhaust opening side in the region shown by R in FIG. 9.

In addition, in each region shown by R in FIG. 9, the region adjoining the third region R3 at the opposite side to the second region R2 is designated as the fourth region R4. In addition, in the region shown by R in FIG. 9, the region adjoining the fourth region R4 at the opposite side to the third region R3 is designated as the fifth region R5. The end part of the fifth region R5 at the opposite side to the fourth region R4 side is positioned on the center axis D of the intake opening 13 or at the opposite exhaust opening side from the center axis D.

If dividing each region R, over which the wall surface 61 extends, into the first region R1 to the fifth region R5 as explained above, in the present embodiment, the wall surface 61 is formed so that the height h1 at the first region R1 is lower than the heights h2 to h5 at the other regions (second region R2 to fifth region R5). Therefore, the wall surface 61 is formed so that the height h1 at the first region R1 is lower than the height at the region positioned separated the most from the exhaust opening side in the third region R3. The height h1 at the first region R1 may also be zero.

In addition, in the present embodiment, each wall surface 61 is formed so that the height h2 at the second region R2 and the height h3 at the third region R3 are certain equal heights. The heights h2 and h3 are equal to the height ha when the wall surface 61 extends so that the edge part of the wall surface 61 in the lift direction of the intake valve 21 (below, referred to as the "lift direction side edge part") in the region positioned separated the most from the exhaust opening side is positioned on the abutting surface A of the cylinder head 3 (below, referred to as the "the minimum abutting height"). Therefore, the wall surface 61 is formed so that the height h2 at the second region R2 is equal to the height ha at the region positioned separated the most from the exhaust opening side (minimum abutting height).

In this regard, as explained above, the top surface of each combustion chamber 7 is slanted due to the intake side slanted surface 17. The intake side slanted surface 17 is formed so that the height from the abutting surface A becomes higher from the edge part of the intake opening side (opposite exhaust opening side) toward the center plane C. Therefore, in the second region R2 and the third region R3 other than the region positioned separated the most from the exhaust opening side, the edge part of the wall surface 61 in the lift direction side is not positioned on the abutting surface A of the cylinder head 3.

Furthermore, in the present embodiment, each wall surface 61 is formed so that the height h5 in the fifth region R5 is higher than the heights h1 to h4 in the other regions (first region R1 to the fourth region R4). In particular, the height h5 of the fifth region R5 is a height whereby the wall surface 61 extends up to the abutting surface A of the cylinder head 3 in the lift direction of the intake valve 21. In this regard, as explained above, the top surface of the combustion chamber 7 is slanted due to the intake side slanted surface 17, and therefore in the fifth region R5, the wall surface 61 is formed so that the height becomes higher toward the center plane C.

Further, in the fourth region R4, the wall surface 61 is formed so that the height h4 gradually becomes higher from the relatively low height h3 in the third region R3 toward the relatively high height h5 in the fifth region R5 in the circumferential direction.

Action and Effect

Figure 10:
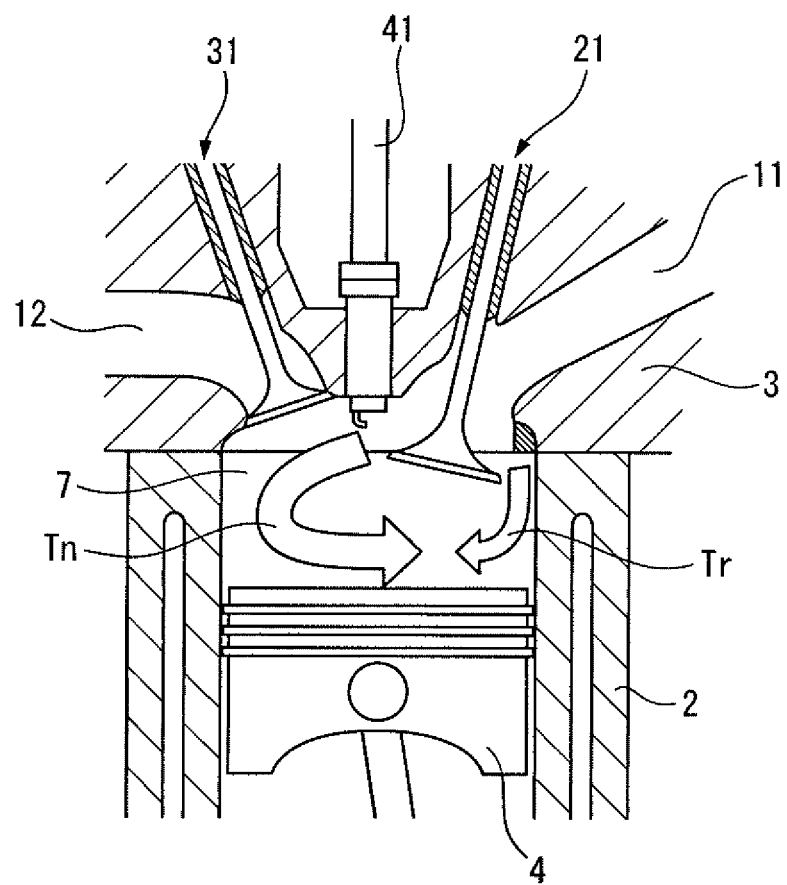
FIG. 10 is a view schematically showing the flow of intake gas generated in the combustion chamber in the case where the intake valves are open.
Figure 11:
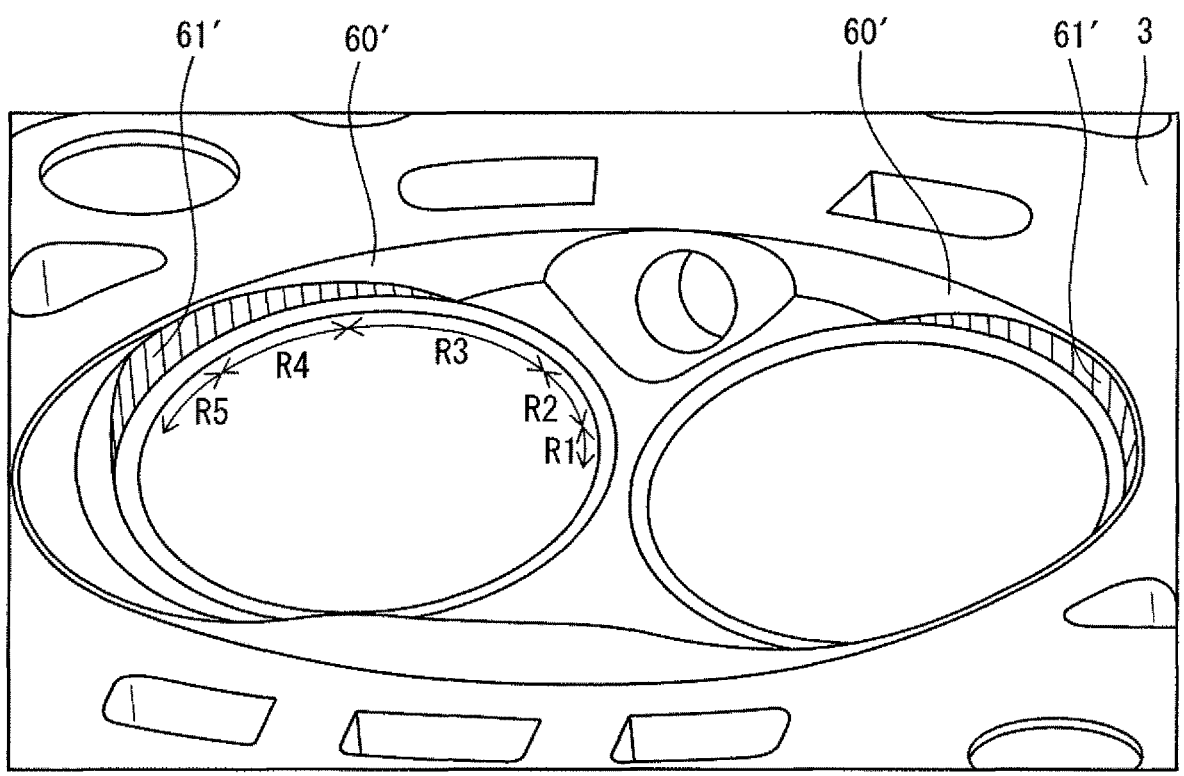
FIG. 11 is a partial perspective view, similar to FIG. 8, showing a bottom surface of part of a cylinder head, in the case where mask parts different from the present embodiment are provided.
Figure 12:
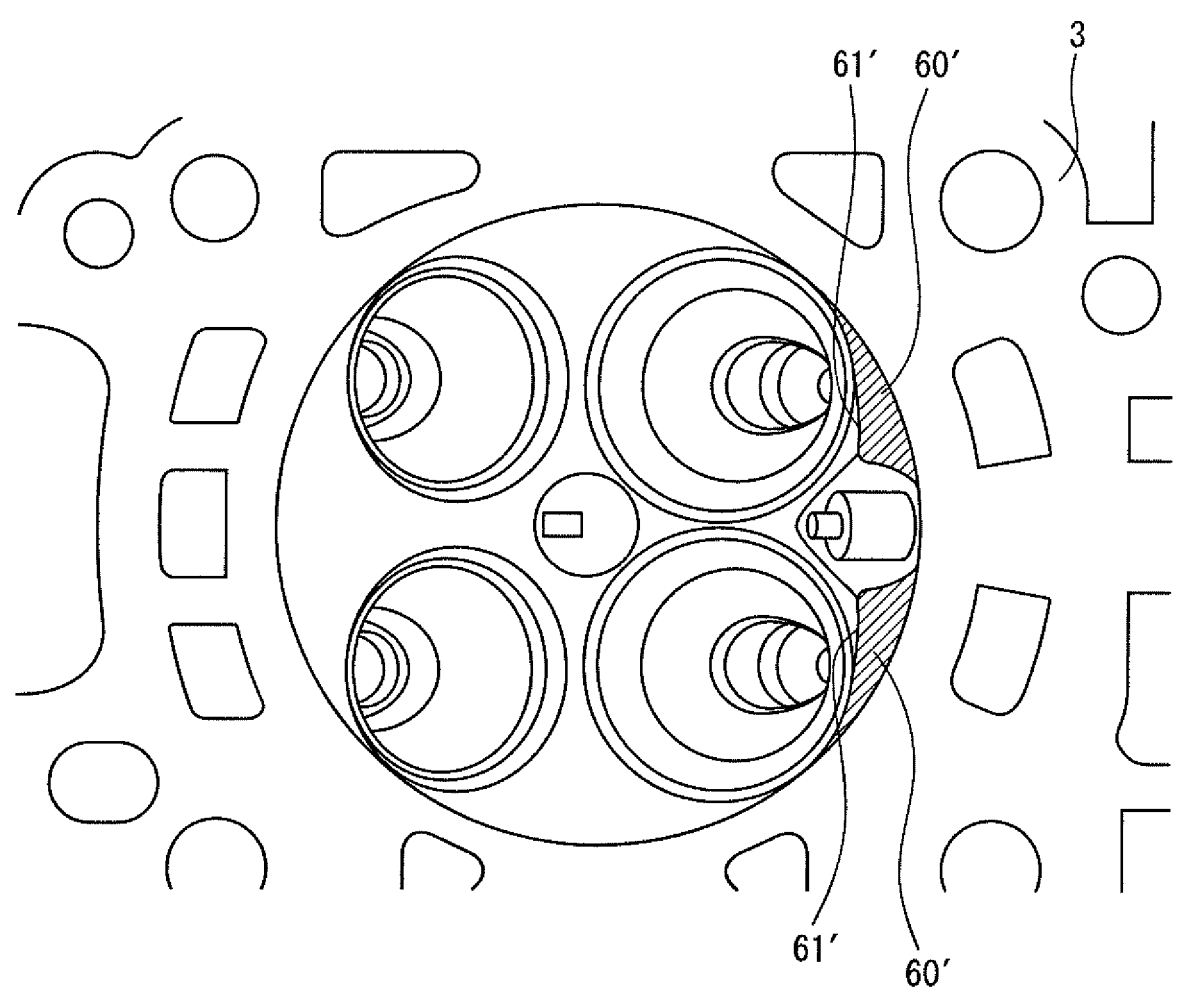
FIG. 12 is a partial bottom view similar to FIG. 2, schematically showing a bottom surface of a cylinder head, in the case where mask parts different from the present embodiment are provided.

Next, referring to FIG. 10 to FIG. 12, the action and effect of the internal combustion engine 1 according to the present embodiment will be explained. FIG. 10 is a view schematically showing the flow of intake gas generated in a combustion chamber 7 in the case where the intake valves 21 are opened. FIG. 11 is a partial perspective view, similar to FIG. 8, showing the bottom surface of part of the cylinder head in the case where mask parts different from the present embodiment are provided. FIG. 12 is a partial bottom view, similar to FIG. 2, schematically showing the bottom surface of the cylinder head in the case where mask parts different from the present embodiment are provided.

As explained with reference to FIG. 5, each first nozzle hole 53#1 injects fuel in a direction of the smallest angle θ from the plane S in the plurality of nozzle holes 53. On the other hand, the wall surface 61 of each mask part 60 is formed so that the height h1 at the first region R1 is the lowest. Therefore, the fuel spray from each first nozzle hole 53#1 is harder to interfere with the mask part 60, and thus the fuel injected from the first nozzle hole 53#1 is harder to deposit on the mask part 60.

If fuel injected from the nozzle holes 53 deposits on the mask parts 60, fuel not contributing to combustion increases and accordingly the fuel efficiency deteriorates. Further, if fuel injected from the nozzle hole 53 deposits on the mask parts 60, particulate matter is generated from the fuel depositing during combustion of the air-fuel mixture in the combustion chamber 7 and the mixed condition of air and fuel deteriorates, whereby the exhaust emission deteriorates. In the present embodiment, since the fuel injected from each first nozzle hole 53#1 is harder to deposit on the mask parts 60, it is possible to suppress deterioration of the fuel efficiency and the exhaust emission.

In this regard, when the intake valves 21 are open, intake gas flows into the combustion chamber 7 through the regions at the exhaust opening sides of the intake openings 13 and the regions at the opposite exhaust opening sides of the intake openings 13. As shown in FIG. 10, in this, the intake gas flowing into the combustion chamber 7 through the regions at the exhaust opening sides of the intake openings 13 generates a normal tumble flow Tn in the combustion chamber 7. On the other hand, the intake gas flowing into the combustion chamber 7 through the regions at the opposite exhaust opening sides of the intake openings 13 generates a reverse tumble flow Tr in the combustion chamber 7. Therefore, if the intake gas flowing into the combustion chamber 7 through the regions at the opposite exhaust opening sides of the intake openings 13 is greater, the reverse tumble flow Tr is stronger and the normal tumble flow Tn is inhibited. As a result, the tumble ratio of the normal tumble flow generated in the combustion chamber 7 is smaller.

As opposed to this, when providing the mask parts 60, the flow of intake gas flowing into the combustion chamber 7 through the regions at the opposite exhaust opening sides of the intake openings 13 is inhibited. As a result, it is possible to weaken the reverse tumble flow Tr generated in the combustion chamber 7 and accordingly possible to strengthen the normal tumble flow generated in the combustion chamber 7. In particular, the higher the height of the wall surfaces 61 of the mask parts 60 is made, the weaker the reverse tumble flow Tr can be made.

On the other hand, in the present embodiment, each wall surface 61 is formed so that the heights h2 to h5 in the regions other than the first region R1 (second region R2 to fifth region R5) is higher than the height h1 in the first region R1. Therefore, in the regions other than the first region R1, the wall surface 61 is formed so as to have a certain extent of height. Accordingly, the reverse tumble flow Tr generated in the combustion chamber 7 can be weaker.

For example, in the example shown in FIGS. 11 and 12, even at parts of the second region R2 and the third region R3, the height of the wall surface 61' is lower to the same extent as the height of the wall surface 61' at the first region R1. In such a case, part of the intake gas flowing into the combustion chamber 7 through the regions at the opposite exhaust opening side of the intake openings 13 flows in without being obstructed at the mask parts 60'. As opposed to this, according to the present embodiment, in the regions other than the first region R1, the wall surface 61' is formed so as to have a certain extent of height, and therefore it is possible to weaken more the reverse tumble flow Tr generated in the combustion chamber 7, compared with the example shown in FIGS. 11 and 12.

Further, in the present embodiment, in each second region R2, the height of the wall surface 61 is the minimum abutting height. Therefore, in the second region R2, the wall surface 61 does not extend up to the abutting surface A to the cylinder head 3 and accordingly the height is relatively low. As a result, the fuel spray from the nozzle hole 53 other than the first nozzle hole 53#1 also is resistant to interference from the mask parts 60 and accordingly the injected fuel from the nozzle hole 53 other than the first nozzle hole 53#1 also is harder to deposit at the mask parts 60. As a result, the fuel efficiency and the exhaust emission can be kept from deteriorating.

MODIFICATIONS

Note that, in the above embodiments, in each second region R2, the height of the wall surface 61 is the minimum abutting height ha. However, the wall surface 61 may also be framed so that the height at the second region R2 is higher than the minimum abutting height ha. In this case as well, at the region positioned separated the most from the exhaust opening side at the third region R3, the height of the wall surface 61 is the minimum abutting height ha.

In addition, in the above embodiments, the height h5 of the fifth region R5 is a height whereby the wall surface 61 extends up to the abutting surface A of the cylinder head 3 in the lift direction of the intake valve 21. However, the height h5 of the fifth region R5 may also be lower than this height. However, even in such a case, the height h5 of the fifth region R5 is equal to or greater than a minimum abutting height ha.

The invention claimed is:

1. An internal combustion engine comprising:
   two intake openings facing a combustion chamber, and opened and closed by intake valves;
   exhaust openings facing the combustion chamber, and opened and closed by exhaust valves;
   a fuel injector having a plurality of nozzle holes; and
   mask parts having wall surfaces extending along outer edges of the intake openings toward the inside of the combustion chamber at the opposite sides to the exhaust opening sides,
   wherein the fuel injector is arranged so that the nozzle holes are positioned between the two intake openings at the opposite sides to the exhaust opening sides from the intake openings,
   the plurality of nozzle holes include a first nozzle hole, among the plurality of nozzle holes, injecting fuel in a direction with the smallest angle from a plane perpendicular to the axial direction of the cylinder, and
   the wall surfaces are formed so that a height in a first nozzle hole ejection region positioned in a range of injection of a fuel spray from the first nozzle hole, when viewed in the axial direction of the cylinder, is lower than a height in regions other than the first nozzle hole ejection region.

2. The internal combustion engine according to claim 1, wherein the wall surface is formed so that a height in another nozzle hole ejection region positioned outside of a range of injection of a fuel spray from the first nozzle hole and inside of a range of injection of a fuel spray from a nozzle hole other than the first nozzle hole, when viewed in the axial direction of the cylinder, is equal to a height of a region separated the most from the exhaust opening side.

3. The internal combustion engine according to claim 1, wherein
   the first nozzle hole is just a single hole, and
   the fuel injector is configured so that a center axis of a fuel spray from the first nozzle hole passes between the two intake openings.

4. The internal combustion engine according to claim 2, wherein
   the first nozzle hole is just a single hole, and
   the fuel injector is configured so that a center axis of a fuel spray from the first nozzle hole passes between the two intake openings.

* * * * *